(No Model.)
J. G. MOREY.
DENTAL SEPARATOR.
No. 426,733. Patented Apr. 29, 1890.
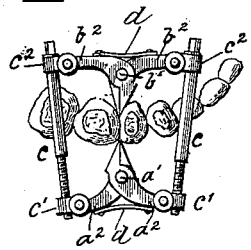
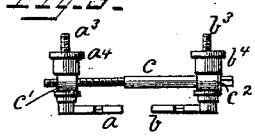
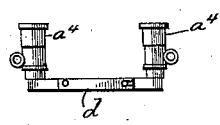
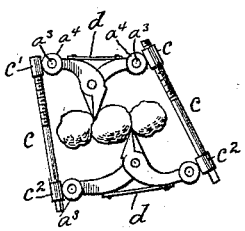
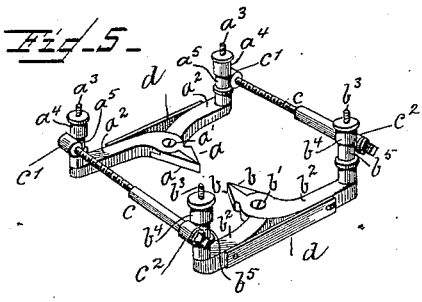
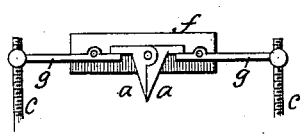
Witnesses
Edwin T. Yewell,
Wm. F. Hintemann.
Inventor
J. Gardner Morey
By his Attorney
D. B. Gallatin

UNITED STATES PATENT OFFICE.

JOHN GARDNER MOREY, OF NEW YORK, N. Y.

DENTAL SEPARATOR.

SPECIFICATION forming part of Letters Patent No. 426,733, dated April 29, 1890.

Application filed September 29, 1887. Renewed October 9, 1889. Serial No. 326,494. (No model.)

*To all whom it may concern:*

Be it known that I, JOHN GARDNER MOREY, a citizen of Great Britain, residing at New York, in the county of New York and State of New York, have invented certain new and useful Improvements in Dental Tools; and I do hereby declare the following to be a full, clear, and exact description of the invention, such as will enable others skilled in the art to which it appertains to make and use the same.

When the teeth stand close together, it sometimes becomes necessary, in order to be able to perform certain operations—such, for example, as filling cavities opening toward adjacent teeth—to separate or spread them apart to gain access to the cavities, and for this purpose tools have been devised which are known as "dental separators."

My invention relates to this class of tools; and my object is to provide a separator which shall be simple in construction and operation, convenient and effective in use, and not liable to injure the teeth.

To these ends the invention consists, essentially, of two pairs of lever-jaws adjustably connected together and facing each other, so as to be applied to opposite sides of the teeth and operated simultaneously to pry the teeth apart.

The accompanying drawings, which illustrate my invention and form a part of this specification, show two constructions, both involving the same principle of operation, one being a modification of the other.

Figures 1 and 2 are plan views of my separator, showing the manner of applying it to the teeth. Figs. 3 and 4 are side and front elevations, respectively; and Fig. 5 a perspective view of the same. Fig. 6 is a plan view of a modification.

I will first describe the construction shown in Figs. 1 to 5.

$a\ a$ and $b\ b$ designate two pairs of jaws, pivoted, respectively, at $a'\ b'$, and having lever-bars $a^2\ a^2\ b^2\ b^2$, after the manner of the handles of pliers or forceps, except that in this case the lever-bars are bent apart, so as to stand in the normal position, substantially in line with each other. The lever-bars of the two pairs of jaws are connected by screw-rods $c\ c$, the jaws facing or standing toward each other.

The lever-bars $a^2\ a^2\ b^2\ b^2$ have at their ends vertical screw-threaded posts $a^3\ a^3\ b^3\ b^3$, which are fitted with internally-threaded sleeves $a^4\ a^4\ b^4\ b^4$, capable of being screwed up and down thereon. These sleeves are provided with collars $a^5\ a^5\ b^5\ b^5$, which are fitted to annular or circumferential grooves therein, thus forming a swivel-connection which permits the sleeve to turn in and independently of the collars to screw the same up and down on the posts for the purpose of effecting various adjustments, as will be hereinafter explained.

The collars $a^5\ a^5\ b^5\ b^5$ carry perforated lugs or ears $c'\ c'\ c^2\ c^2$, through which the ends of the rods $c\ c$ extend to connect the two pairs of lever-bars.

The rods $c\ c$ have a swivel-connection at one end with the lugs or ears $c^2\ c^2$, and at the other end a screw-connection with the lugs or ears $c'\ c'$, whereby the turning of the rods in one direction or the other moves the two pairs of jaws and their lever-bars toward or from each other.

Evidently the rods $c\ c$ may have screw-connections at both ends—a right-hand screw at one end and a left-hand screw at the other. This would give a more rapid movement without modifying the operation.

$d\ d$ are springs applied to the backs of the levers to hold the jaws normally closed.

This separator is applied and used in the following manner: The sleeves $a^4\ a^4\ b^4\ b^4$ are first vertically adjusted on the posts $a^3\ a^3\ b^3\ b^3$ by screwing them up or down thereon, to bring the jaws the requisite distance below the plane of the rods $c\ c$ to permit them to be set down over the teeth, so as to engage and act upon the latter at the proper points. Then the the rods $c\ c$ are turned to draw the parts toward each other. As soon as the movement of the jaws toward each other is arrested by their points striking against the teeth on opposite sides the spreading action begins, the jaws of each pair being opened or spread apart by the continued action of the screws, whereby the ends of the opposite pairs of lever-bars are drawn together until the teeth are separated to the desired extent.

This separator is adapted to be used to separate two adjacent teeth, as illustrated in Fig. 1, or three, as represented in Fig. 2, the middle tooth in such case being used as a fulcrum for the jaws and the outer teeth being pried away therefrom in opposite directions. This is a capability and an advantage not possessed, so far as I know, by any of the separators heretofore devised.

In the construction illustrated in Fig. 6 the jaws of each pair are pivoted together and to carrying-blocks $f$. Their lever-bars are shortened and are acted upon by separate levers $g$ $g$, which are also fulcrumed on said carrying-blocks, their outer ends being connected by screw-rods $c$ $c$, by which they are drawn together, causing their inner ends to pry the lever-bars of the jaws outward, and thus open or spread the latter. The action of this separator is the same as that above described.

Fig. 6 shows only one half of the separator; but it will be understood that the other half is the counterpart of that shown, and that the levers $g$ $g$ are connected by the screws $c$ $c$ in the manner above explained with reference to Figs. 1 to 5.

It is to be observed that by the adjustability of the parts the two pairs of jaws may be set in different planes, so that those acting upon one side of the teeth will act above or below those on the opposite side. Again, by screwing the two diagonally-opposite sleeves $a^4$ $b^4$ up or down on their posts and the other two in the opposite direction (for slight adjustments the latter need not be moved at all) the pairs of jaws can be given an angular adjustment relatively to each other, whereby they will be caused to open in oppositely-inclined planes to adapt them to crooked or overlapping teeth. The utility and importance of this adaptation will be readily perceived by those who have had experience in separating crooked teeth. It is further to be observed that the separation can be effected by turning up one of the screws $c$ only, which is an important feature when operating upon teeth far back in the mouth. This also adapts the positions of the ends of the lever-bars and of the posts $a^3$ $b^3$ to be varied or shifted, so as to afford free access to the cavity to be treated should the latter be obstructed thereby.

Having now fully described my invention, I claim as new—

1. The dental separator hereinbefore described, consisting, essentially, of two pairs of pivoted jaws having lever-bars, the pairs of jaws facing each other, and connections between the opposite lever-bars, whereby they may be operated to open the jaws, substantially as shown and described.

2. The dental separator hereinbefore described, consisting of two pairs of pivoted jaws having lever-bars, the pairs of jaws facing each other, and the lever-bars of one pair connected with those of the opposite pair by an adjustable connection, whereby the pairs of jaws may be moved toward and from each other and caused to open or spread apart when arrested by the teeth, substantially as shown and described.

3. The dental separator hereinbefore described, consisting of two pairs of pivoted jaws having lever-bars, the pairs of jaws facing each other, and the lever-bars of one pair connected to those of the other pair by adjustable connections, whereby they may be moved toward or from each other, said connections being also adjustable up and down on posts which stand at right angles to the plane of the jaws, substantially as shown and described.

4. In a dental separator, the combination of two pairs of pivoted jaws having lever-bars $a^2$ $a^2$ $b^2$ $b^2$, said lever-bars having at their outer ends vertical screw-threaded posts $a^3$ $a^3$ $b^3$ $b^3$, screw-threaded sleeves $a^4$ $a^4$ $b^4$ $b^4$ on said posts and capable of being screwed up and down thereon, collars $a^5$ $a^5$ $b^5$ $b^5$ swiveled upon said sleeves and carrying lugs or ears $c$ $c'$ $c^2$ $c^2$, and screw-rods $c$ $c$ passing through opposite ears $c'$ $c^2$, whereby the opposite levers of the two pairs of jaws are adjustably connected, substantially as and for the purpose described.

5. The dental separator hereinbefore described, consisting of two pairs of pivoted jaws having lever-bars, the pairs of jaws facing each other, and the arms of one pair connected with the other by an adjustable connection, and springs applied to the backs of the lever-bars to hold the jaws normally closed, substantially as and for the purpose described.

In testimony whereof I affix my signature in presence of two witnesses.

JOHN GARDNER MOREY.

Witnesses:
J. L. HAIGHT,
JNO. W. ASHER.